United States Patent

[11] 3,552,386

| [72] | Inventor | Thomas C. Horth |
|---|---|---|
| | | Burlington, Mass. |
| [21] | Appl. No. | 786,002 |
| [22] | Filed | Dec. 23, 1968 |
| [45] | Patented | Jan. 5, 1971 |
| [73] | Assignee | Hewlett - Packard Company |
| | | Palo Alto, Calif. |
| | | a corporation of California |
| | | Continuation-in-part of application Ser. No. 687,379, Dec. 1, 1967, now Patent No. 3,524,442. |

[54] ARRHYTHMIA DETECTING APPARATUS AND METHOD
12 Claims, 6 Drawing Figs.

| [52] | U.S. Cl. | 128/2.06 |
|---|---|---|
| [51] | Int. Cl. | A61b 5/04 |
| [50] | Field of Search | 128/2.05M, 2.05P, 2.05S, 2.05T, 2.06 |

[56] References Cited
UNITED STATES PATENTS

| 3,123,768 | 3/1964 | Burch et al. | 128/2.06X |
| 3,138,151 | 6/1964 | Champman et al. | 128/2.05(P) |
| 3,144,019 | 8/1964 | Haber | 128/2.06 |
| 3,267,933 | 8/1966 | Mills et al. | 128/2.06 |
| 3,267,934 | 8/1966 | Thornton | 128/2.06 |
| 3,318,303 | 5/1967 | Hammacher | 128/2.05(S) |
| 3,352,300 | 11/1967 | Rose | 128/2.06 |

*Primary Examiner*—William E. Kamm
*Attorney*—Stephen P. Fox

ABSTRACT: A system operates to threshold detect electrocardiographic (ECG) signals received from a patient to determine the presence of QRS wave portions. The width of the QRS waves is measured by digital techniques. During a first operating period, a QRS width is stored in memory as a "normal" for the patient, and during a subsequent operating period, the patient's QRS waves are compared with the stored "normal". The system responds only to selected ECG pulses having a predetermined derivative threshold and predetermined time duration relationships. Additional digital circuitry detects when QRS waves are premature by a predetermined amount. The recurrence of abnormally wide or premature QRS waves causes the activation of alarms and control signals.

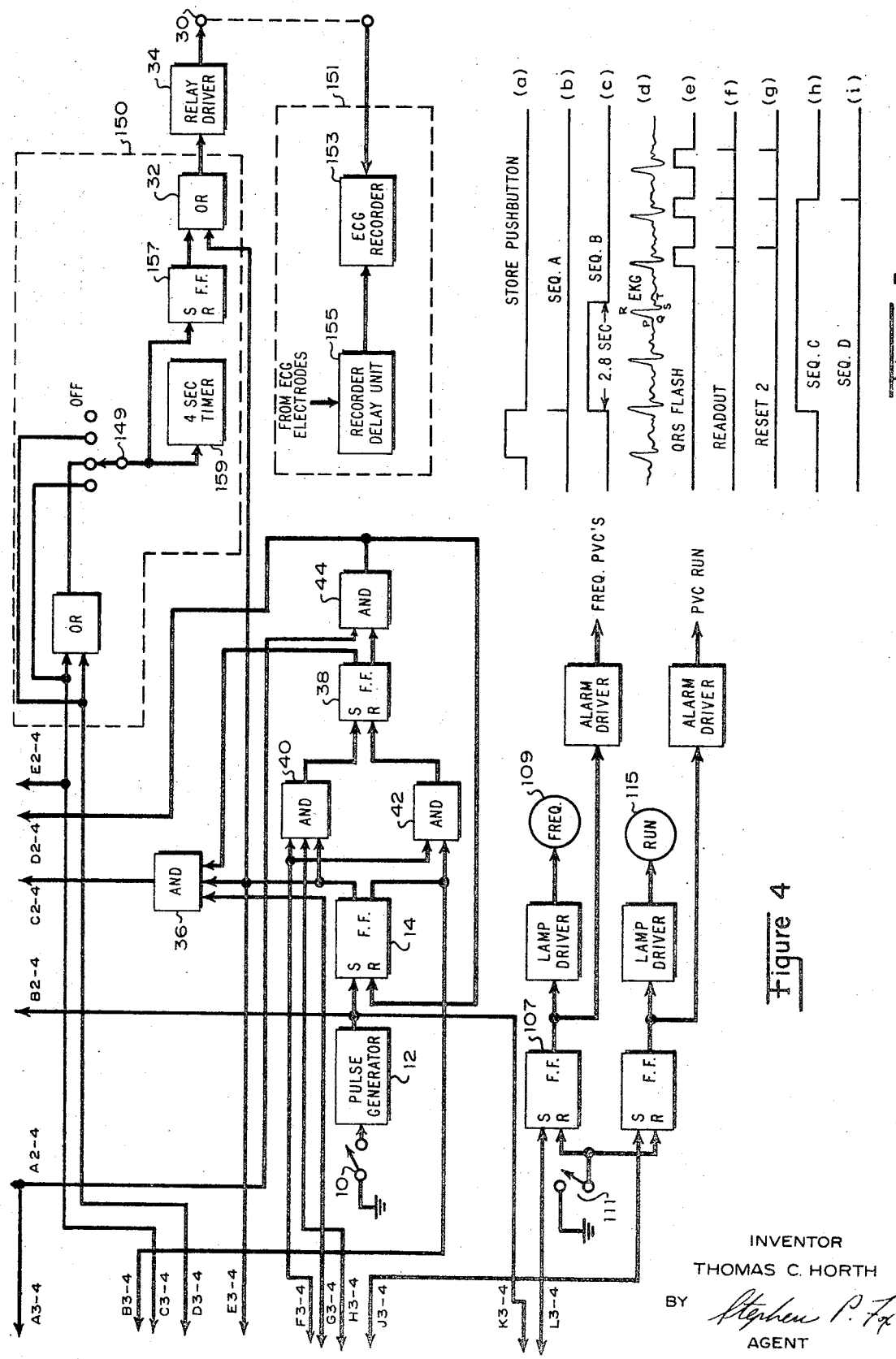

3,552,386

ARRHYTHMIA DETECTING APPARATUS AND METHOD

This application is a continuation-in-part of application Ser. No. 687,379, filed Dec. 1, 1967 and now U.S. Pat. No. 3,524,442 and assigned to the same assignee as the present application.

BACKGROUND OF THE INVENTION

Reports indicate that the mortality rate due to myocardial infarction peaks at the onset of a heat heart attack and recedes almost exponentially with time, with about 65 percent of deaths occuring in the first three days and about 85 percent of deaths occurring in the first week after attack. Vertricular fibrillation and other serious departures from normal heart activity following infarction are almost always preceded by abnormally wide beats, commonly referred to as premature ventricular contractions (PVC). The increasing rate of occurrence of PVCs is an important indication of the onset of serious arrhythmias such as ventricular tachycardia, flutter and fibrillation.

The onset of arrhythmias may be prevented if drugs are administered early enough to regulate the heart activity. Various systems have been developed to detect selected types of abnormal heart beats and thus to indicate the serious nature of a patient's heart activity in time to treat the patient. Typically, these systems detect the particular portion of an ECG. signal designated in the literature as a QRS waveform.

In prior art systems, detection of the QRS waveform is generally accomplished by threshold sensing the amplitude of the ECG. signal. However, it has been found that such amplitude sensing systems have the disadvantage that they are very susceptible to spurious noise interference such as high frequency noise, cardiac Pacemaker noise, and particularly noise from the transducer electrodes which are in contact with the patient. This noise susceptibility often leads to false indications of heart abnormalities where they do not exist, and more importantly, the noise interference may mask the ECG. signals and thus prevent real abnormalities from being detected.

One physiologically meaningful part of a complex QRS waveform is the entire width thereof. However, in systems which threshold sense the amplitude of an ECG. signal, only a portion of the complex QRS waveform is detected, i.e., the portion for which the amplitude is greater than a predetermined threshold level. Therefore, amplitude sensing systems may produce inaccurate QRS width measurements, particularly in the case where a large percentage of the QRS waveform occurs at low amplitudes, below the threshold level setting of the system.

SUMMARY OF THE INVENTION

Accordingly, the illustrated embodiment of the present invention comprises an arrhythmia detector system which is insensitive to noise interference and which accurately indicates the width of selected waveforms, such as a complex QRS waveform in an ECG. signal. The beginning and end of a QRS waveform are detected by threshold sensing means responsive to the derivative, rather than the amplitude, of the ECG. signal. Since amplitude threshold sensing is not employed, the attendant disadvantages thereof described above are substantially eliminated. Noise interference in the ECG. signal is rejected by pulse stretching and delay circuitry which is responsive to the output from the derivative threshold sensing means.

The present arrhythmia detector system is first operated in a storage mode to store information regarding the width of the QRS wave portions of the ECG. signals during a selected period of normal heart activity of a patient. Following this, the circuit operates to compare the ECG. signals subsequently received from the patient with the signal information previously stored for producing alarm outputs in response to variations in the compared signals exceeding preselected limits.

BRIEF DESCRIPTION OF THE DRAWINGS

FIGS. 1—4 are sections of an overall schematic diagram of the arrhythmia detector circuit of the present invention; these four figures fit together as shown in the diagram in the upper left portion of FIG. 1.

FIGS. 5 and 6 are graphs showing the signals appearing at selected points in the circuit of FIGS. 1—4.

DESCRIPTION OF THE PREFERRED EMBODIMENT

Figure 1:
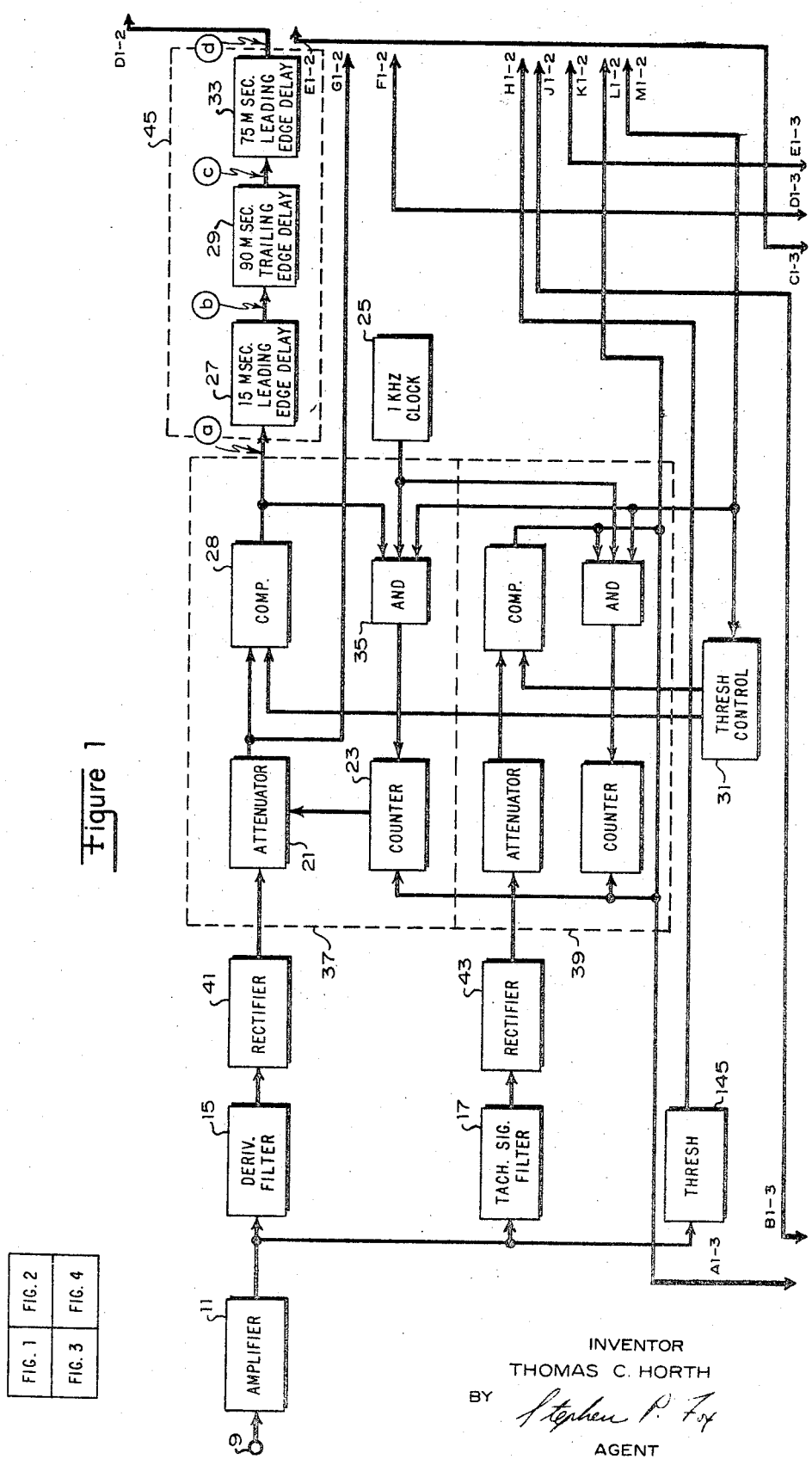

Referring now to the figures, there is shown an input terminal 9 which receives electrocardiographic (ECG.) signals from a patient. Buffer amplifier 11 connected to the input terminal 9 eliminates loading of received ECG. signals and its output is applied to two band-pass filters 15 and 17. The derivative filter 15 peaks at approximately 25 hertz and the tachometer signal filter 17 peaks at approximately 8 hertz. The output of the derivative filter is applied through a full wave rectifier 41 to a digitally-controlled automatic gain control circuit (AGC) 37 which includes a signal-controlled attenuator 21 that is controlled by the output of counter 23. This counter includes four binary stages which count pulses from oscillator 25 during a Sequence B pulse, later described in connection with the storing cycle of operation shown graphically in FIG. 5, to provide 16 different attenuation settings of the attenuator 21. The comparator 28 and the associated AND gate 35 operates on the output of the threshold control 31 and on the output of attenuator 21 to advance the counter 23 and, hence, adjust attenuator 21 to a setting which attenuates the highest peak of the derivative of the ECG. signal appearing during the Sequence B pulse to approximately the value of threshold signal, say, 1 volt applied to the comparator 28 by the threshold control 31. At the end of a Sequence B pulse, the counter 23 is disconnected from the oscillator 25 by gate 35 and the threshold control 31 lowers the threshold signal by approximately 80 percent to, say 0.20 volts. Thus, after the end of a Sequence B pulse, the comparator 28 produces an output each time the derivative of the ECG. signal exceeds this decreased value of threshold signal.

The signal from the tachometer signal filter 17 is treated in automatic gain control (ACG) circuit 39 in a manner similar to that described hereinabove.

STORAGE CYCLE

Figure 2:
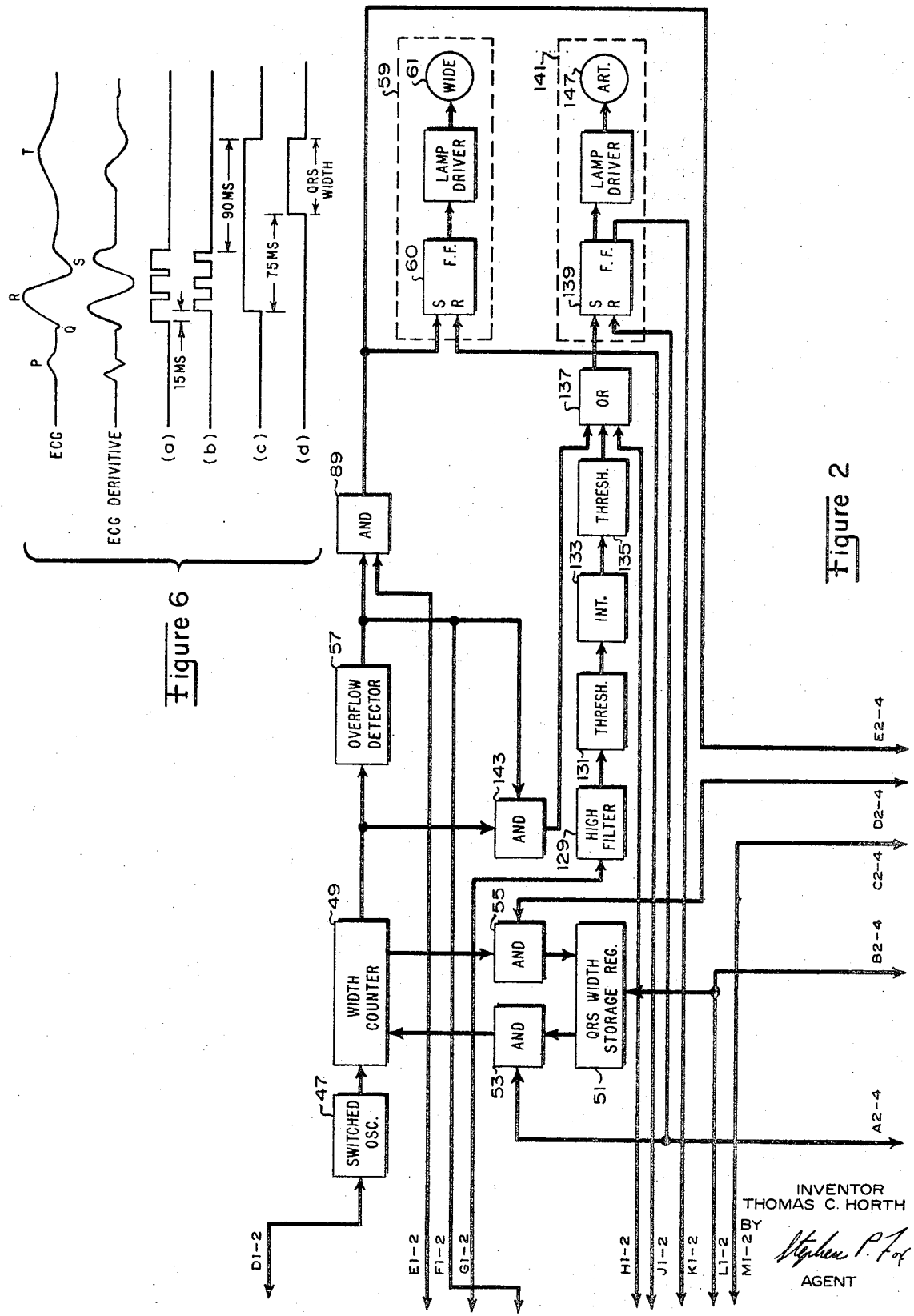

ECG. signals received from a patient are similar to the waveform shown in FIG. 5d during normal heart activity. The QRS portion of each pulse received from a patient is compared in width with the values previously stored during the storage cycle of operation. Each such beat which differs from the stored values by more than a preset tolerance is considered ventricular. The timing of such beats is checked to see if it is premature relative to the rhythm established by the last few previous beats. Thus, if a beat is both premature and ventricular, it is considered a premature ventricular contraction (PVC) and a trend of increasing recurrence of such beats triggers an alarm. Thus, in order to adjust the circuit for proper operation on the particular ECG. signals received from a patient and to store information about the amplitude of the derivative and width of a normal QRS pulse for use as a reference for comparison therewith of subsequent QRS pulses received from the same patient, the arrhythmia detector circuit of the present invention is first operated in its storage cycle mode of operation. When the storage cycle button 10 (FIG. 4) is depressed and released, a Sequence A pulse is generated by generator 12, as shown in FIGS. 5a and b. This pulse performs the following functions: (1) turns on or sets the Sequence C flip-flop 14 which then produces the Sequence C pulse of FIG. 5h that remains present for the entire storage cycle; (2) triggers the oscillator 16 (FIG. 3) which produces outputs spaced a selected time interval apart, say 2.8 seconds; (3) resets the 6-stage binary counter 18 to zero; (4) resets the PVC storage register 22 to zero; (5) resets the AGC circuits 37 and 39 for minimum signal attenuation; and (6) sets the QRS width storage register 51 (FIG. 2) to two rather than zero for reasons described later. The Sequence C pulse at the output of flip-flop 14 (FIG. 4) also performs several functions as follows: (1) actuates the indicator lamp 24 (FIG. 3) through gate 26 and flip-flop 28; (2) resets the PVC counter 20 to zero; (3) controls the operation of a remote electrocardiograph recorder 153 (FIG. 4) connected to output terminal 30 through OR gate 32 and relay driver 34 so that a graphic record may be produced of the QRS pulses that provide the reference values stored by the circuit; and (4) combines in AND gate 36 with the EVEN output of counter 18 (FIG. 3) and the output of width storage flip-flop 38 (FIG. 4) to produce the Sequence B pulse, as shown in FIG. 5c. Sequence C pulse is also combined in AND gate 40 with the ODD output of counter 18 (FIG. 3) and the Reset 2 pulse produced by the tachometer circuitry to set the width storage flip-flop 38 (FIG. 4) at the end of the Sequence B pulse. The signal from the width storage flip-flop 38 is combined in AND gate 44 with the Readout pulse, as shown in FIG. 5f, produced by the tachometer circuitry to produce the Sequence D pulse shown in FIG. 5i. This occurs after the second QRS pulse following the end of the Sequence B pulse. The Sequence D pulse causes the count in width counter 49 (FIG. 2) related to the reference QRS pulse width to be transferred into storage in register 51 through the AND gate 55 and also resets the Sequence C flip-flop 14 (FIG. 4). The reset output of flip-flop 14 then combines in AND gate 42 with the Reset 2 pulse to reset the width storage flip-flop 38 and thereby end the storage cycle.

QRS WIDTH DETERMINATION

The width of the QRS portion of the ECG. signal is measured as the time from the beginning of the first excursion of the derivative of the ECG. above the aforementioned derivative threshold level to the end of the last such derivative excursion, provided that the first excursion is at least 15 msec. in duration and that any gap between the first and last excursions is no more than 90 msec. in duration. When these conditions are met, a pulse stretching circuit 45 (FIG. 1) produces an output pulse having a width corresponding to that of the QRS portion of the ECG. signal.

The configuration and operation of pulse stretching circuit 45 may be understood by reference to FIG. 6, wherein the waveforms (a)—(d) are those at the corresponding points a-—d in FIG. 1. The output of the derivative comparator 28, as shown in FIG. 6a, is fed to a circuit 27 which delays the leading edge of any pulses from the derivative comparator by 15 msec., without significantly affecting the trailing edges of the pulses. The output of delay circuit 27 is shown in FIG. 6b. It is to be noted that any excursions of the derivative above the threshold level for periods less than 15 msec. will produce no output, so that most high frequency interfering noise will be rejected.

The trailing edge of each pulse from delay circuit 27 is delayed 90 msec. by delay circuit 29, as shown in FIG. 6c, in order to maintain signal continuity between successive pulses from the derivative comparator 28. The delay circuit 29 is not responsive to input pulses separated by more than 90 msec., such as those which might be generated by electrode noise.

Finally, the leading edge of the output pulse from delay circuit 29 is delayed 75 msec. by another delay circuit 33. The resulting output pulse from delay circuit 33 is illustrated in FIG. 6d and is equal in time duration to that of the QRS portion of the ECG. since both the pulses corresponding to both the leading and trailing edges of the QRS waveform have been delayed 90 msec.

The output signal from delay circuit 33 turns on an oscillator 47 (FIG. 2) which generates a pulse at selected intervals, say every 6 msec. Pulses from oscillator 47 are counted in a 5-stage binary counter 49 for comparison with the count which was previously stored in the QRS width storage register 51 during the storage cycle of operation. Thus, referring to the operation of this portion of the present circuitry during the storage cycle, the QRS width storage register 51 is set to an initial value of two (rather than zero) by the Sequence A pulse, as shown in FIG. 5b. A train of clock pulses is generated by tachometer circuitry, later described, after each QRS pulse is detected following the Sequence A pulse. The last of these clock pulses is identified as the Reset 2 pulse which transfers the count in the register 51 to the counter 49. This Reset 2 pulse appears just after the first QRS pulse that appears following a Sequence B pulse (FIG. 5c) in the storage cycle and causes the initially-set value of two in the register 51 to be transferred through AND gate 53 to the counter 49. The QRS pulse which is second to appear after the Sequence B pulse is measured by counting pulses from oscillator 47 and the total count of pulses is the QRS width plus two counts. This count provides reference width with a 12 msec. tolerance (represented by the two extra counts) included. After this second-appearing QRS pulse, the complement of the reference-width count in the counter 49 is transferred through AND gate 55 to the storage register by a Sequence D pulse (FIG. 5i) which occurs just prior to the next Reset 2 pulse (FIG. 5g). The complement of the reference width count thus stored in the register 51 is transferred back to the counter 49 on each succeeding Reset 2 pulse applied to gate 53. Since adding a complement in binary arithmetic is equivalent to subtracting, the subsequent count by counter 49 so conditioned by pulses from oscillator 47 during a QRS pulse thus provides a comparison of the QRS pulse width with the reference width and any overflow from the counter 49 thus indicates that the measured width exceeded the reference width. Overflow signals from counter 49 are detected by detector 57 and are verified in a manner later described to rule out the presence of any artifacts or errors, and are then applied to indicator circuitry 59 including a panel lamp 61 to indicate the occurrence of a wide beat. The indicator circuitry 59 is reset by the next QRS pulse which appears at the output of a flip-flop 63 (FIG. 3), described hereinafter.

The output of the AGC circuit 39 which follows the tachometer signal filter 17 sets the Flash flip-flop 63 at each occurrence of a QRS beat. This sets a timer 65 which then automatically resets the Flash flip-flop 63 after a selected dead time, say 240 msec., during which flip-flop 63 cannot be retriggered by another QRS beat. This dead time thus also limits the circuit to operation on heartbeats occurring at rates lower than 250 beats per minute. The output of flip-flop 63 provides the QRS pulses of FIG. 5e which operate the indicator lamp 24 and which reset the wide beat flip-flop of indicator circuit 59 (FIG. 2) and the early beat flip-flop 67 (FIG. 3) to turn off the associated indicator lamps before the next beat is analyzed. Also, the trailing edges of the QRS Flash pulses of FIG. 5e trigger the chain of pulse generators 69, 71 and 73 which generate the Readout pulses of FIG. 5f at the output of generator 69, the Reset 1 pulses at the output of generator 71, and the Reset 2 pulses of FIG. 5g at the output of generator 73. The output pulses from the QRS Flash flip-flop 63 which are about 240 msec. in length are applied to the tachometer circuit 75, typically a critically-damped, low-pass filter, to produce an output voltage which is proportional to the heartbeat rate. This rate voltage is applied to the voltage-controlled oscillator 77 to control the frequency of pulses produced thereby at about 2 ½ times the heart rate. The voltage-controlled oscillator 77 is reset by each Reset 1 pulse and is started in synchronism with the QRS beats. The pulses are applied to counter 79 which is reset to zero by each Reset 2 pulse.

If the heartbeat of the patient is regular, counter 79 advances to 1 when 40 percent of the QRS-to-QRS interval passes and to 2 when 80 percent of the interval passes due to the 2½ times faster rate of pulses from oscillator 77. If the next QRS pulse does not occur at the next regular instant, the counter 79 advances to 3 at 120 percent of the expected interval. It will then lock on that count until reset by the next Reset 2 pulse. Thus, a count of 0 to 1 at Readout pulse time (just before Reset 2) indicates that the QRS pulse was at least 20 percent premature and a count of 2 indicates that the QRS pulse was within ± 20 percent of the expected time, while a count of 3 indicates that the QRS pulse was at least 20 percent late.

The gating circuit 81 determines the state of the counter 79 at Readout time for several purposes. If the QRS pulse is early (count = 0 or 1), the Early flip-flop 67 is set by the gating circuit 81 and this activates the Early indicator lamp 83, which remains on until the next QRS Flash pulse. The output of gating circuit 81 is combined in gate 85 with the output of widebeat (overflow) detector 57 (FIG. 2) to provide a signal which indicates that the QRS pulse occurred when expected (count = 2) and was not wide and, hence, indicates that the beat was normal in all respects. This signal thus resets the PVC Run Counter 20 (FIG. 3) to zero through the OR gate 87. The output of gating circuit 81 which indicates that the QRS pulse was not late (count = 0, 1, or 2) is thus applied to gate 89 (FIG. 2) to establish an indication that a beat is wide. The reason for this is that beats detected as late are most likely the result of the tachometer comparator in AGC circuit 39 failing to trigger on the previous beat due to some artifact. In such cases, the beat is frequently erroneously measured to be wide since the width of the missed beat will be added to that of the detected beat. Hence, late, wide beats are ignored.

PVC TREND INDICATION

Figure 3:
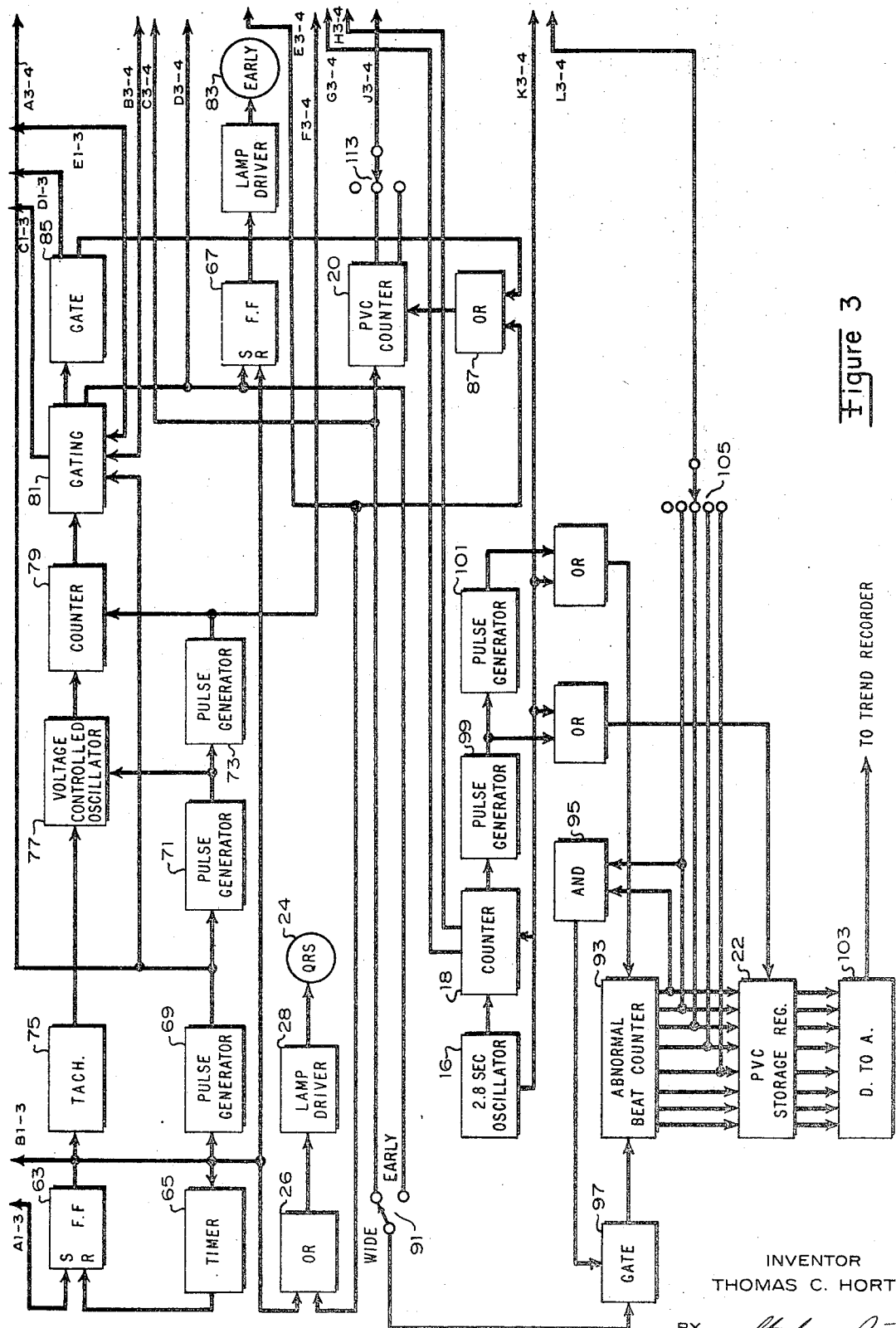

The operator may elect to record the longterm trend in the frequency of recurrence of either wide beats or early beats by means of switch 91 (FIG. 3). Whichever beats are selected are counted in an 8-stage Abnormal Beat counter 93 which has outputs that are weighted 1, 2, 3, 6, 12, 24, 48 and 96. When the counter reaches a count of 144 (two most significant bits = true, as determined by AND gate 95), the counter 93 is gated off by gate 97. Each 3 minutes, as determined by 2.8 -second oscillator 16 and the count-to-64 binary counter 18, the contents of the Abnormal Beat counter 93 are transferred in parallel into the 8-bit storage register 22 and immediately thereafter the counter 93 is reset to zero by the 3-minute reset pulse from the cascaded generators 99 and 101 so that the counter 93 can accumulate abnormal beats in the next 3 minutes.

The outputs of the storage register 22 may be applied to a D-to-A converter 103, weighted as above, to provide an Abnormal Beats/Minute voltage for a trend recorder or other display. The voltage represents the abnormal beats counted in the previous 3-minute period on a selected scale, say, 100 MV/beat/minute.

ALARM CIRCUITS

The fourth, fifth, sixth and seventh stages of the Abnormal Beat counter 93 represent 6, 12, 24 and 48 beats, or 2, 4, 8 and 16 beats/minute. These signals go to the Abnormal Beat alarm switch 105 which allows an operator to select the alarm limit. The selected limit, if it occurs, sets flip-flop 107 (FIG. 4) which, in turn, activates the Frequent Abnormal Beat alarm lamp 109 and activates the corresponding alarm line. The lamp 109 and alarm remain in the activated state until the operator resets the flip-flop 107 by pressing the Reset button 111 connected thereto.

The wide beats are counted by the 4-stage PVC Run counter 20 (FIG. 3) which has outputs weighted 1, 2, 3, 6. This counter is reset to zero by the Sequence C during the storing cycle so that the counter 20 starts correctly, and is also reset any time a "completely normal" beat signal from gate 85 is detected. Thus, counter 20 determines the number of wide beats in a run without intervening normal beats. Signals from the third and fourth stages, representing three and six beats in a run, go to PVC Run alarm switch 113 which allows the operator to select the alarm limit. The Run alarm circuitry and lamp 115 (FIG. 4) operate similarly to the Frequent Abnormal Beat alarm described above.

SPURIOUS SIGNAL REJECTION CIRCUITRY

The present circuitry includes means for detecting and rejecting spurious signals due, for example, to power line interference, electromyographic noise, DC signals from the electrodes, and the like. High frequency spurious signals are received from the derivative filter 15, rectifier 41 and attenuator 21 (FIG. 1) and are passed through a high-frequency filter 129 (FIG. 2) to select out the spurious signals from the QRS beat. If the amplitude of the high-frequency signal at the output of the filter 129 is sufficiently large to cause problems, the threshold detector 131 following the filter 129 passes the spurious signal to an integrator 133. Thus, if the duration of the spurious signal is sufficiently long as well, the threshold circuit 135 following the integrator passes the integrator signal through OR gate 137 to trigger the artifact flip-flop 139 in the alarm circuit 141. The flip-flop 139 may also be triggered by the appearance of a QRS beat which is so wide that it could not possibly be a real beat. The AND gate 143 is connected to receive the overflow output from the counter 49 and the output from the overflow detector 57 connected to the counter 49 to produce an output which triggers flip-flop 139 through OR gate 137 in response to the measured width of a beat exceeding the stored reference width by at least 240 msec. Further, the flip-flop 139 may also be triggered by undesirably large DC levels present at the input terminal 9 (FIG. 1). DC levels due to electrode problems, and the like, which exceed a threshold value determined by threshold circuit 145 are also applied to OR gate 137 (FIG. 2) to trigger the flip-flop 139. Whenever any of the described spurious signals appear with sufficient magnitude and duration to trigger the flip-flop 139, it remains set and maintains the artifact alarm lamp 147 illuminated until the next Reset 2 pulse from generator 73 (FIG. 3) is applied to the reset input of flip-flop 139 (FIG. 4) thereby preventing the beat from being categorized as early or wide.

An output selector circuit 150 (FIG. 4) includes a switch 149 for manually selecting the readout either of EARLY, WIDE, EITHER (early or wide) or SEQUENCE OF WIDE beats that may appear at the input 9. Thus, abnormal beats of selected type may be graphically recorded by remote recording circuitry 151 which includes an ECG. signal recorder 153 connected to be remotely controlled by the present arrhythmia detector circuitry and a tape-loop type signal delay unit 155 which applies to the recorder 153 the same signals from the ECG. signal electrodes positioned on a patient as are applied to input 9. A tape-loop signal delay unit suitable for use as unit 155 is a Model 780-5A instrument manufactured by the Waltham Division, Hewlett-Packard Company, Waltham, Massachusetts.

If switch 149 is set in the OFF position, the remote recorder 153 will only run to record heartbeats occurring during the storing cycle in response to the Sequence C pulse applied to OR gate 32. If switch 149 is set in the EARLY position, any beat detected as early will cause the recorder 153 to run in response to signal from gating circuit 81 (FIG. 3) applied through the switch 149 (FIG. 4) and flip-flop 157 to the OR gate 32. The flip-flop 157 is reset after about 4 seconds in response to the time 159 connected to the reset input. Thus, because of the delay provided by unit 155, the abnormal beat of selected type will appear near the end of the 4-second recorder-run period preceded by two or more normal beats that are useful for evaluating heart rhythm.

If switch 149 is set in the WIDE position, the remote recorder 153 operates as described above in connection with the EARLY setting of switch 149, but only after a wide beat is detected. Also, if switch 149 is set to the EITHER position, the remote recorder 153 operates as described above after a wide or early beat is detected. In either of these cases, however, if a second abnormal beat occurs while the recorder 153 is running, the flip-flop 157 remains in set position and, hence, recorder 153 continues to run for another 4-second recorder-run period.

I claim:

1. An arrhythmia detecting system for operation on electrocardiographic (ECG.) signals normally including P, Q, R, S and T wave portions, said system comprising:

signal-selecting means responsive to said ECG. signals for producing a pulse output when the derivative of a portion of said ECG. signal attains a predetermined threshold value for a certain minimum time interval and does not fall below said threshold value for more than a certain maximum time interval;

circuit means operative during a first and a subsequent operating period and responsive to said derivative pulse output for producing first and second outputs respectively, each of said first and second outputs being indicative of the time during which said derivative pulse output is present during the corresponding one of said operating periods;

storage means for storing said first output produced during said first operating period; and output means operatively coupled to said storage means and said circuit means for producing an output indication when the second output produced during said subsequent operating period attains a predetermined relationship to the stored first output produced during said first operating period.

2. The arrhythmia detecting system of claim 1, said signal-selecting means including:

means for producing the derivative of a received ECG. signal;

means for attenuating said derivative to preselected values;

means for indicating when the attenuated derivative of the QRS portion of said ECG. signal exceeds said predetermined threshold value;

pulse stretching means responsive to said indicating means for producing said derivative pulse output when said attenuated derivative exceeds said threshold value for said minimum time interval and does not fall below threshold value for more than said maximum time interval;

said first output produced by said circuit means being representative of the period of the QRS portion of the ECG. signal; and said output means including means for comparing the width of the QRS portion of the ECG. signal represented by said first output during said first operating period with the width of the QRS portion of the ECG. signal represented by said second output during said subsequent operating period, said comparing means being operable to produce said output indication in response to abnormal QRS portions of the ECG. signal.

3. The system of claim 2, said pulse stretching means including:

first delay means responsive to said indicating means for producing a signal each time said attenuated derivative exceeds said threshold value for said minimum time interval;

second delay means for producing a signal as long as successive signals from said first delay means occur within said maximum time interval; and means responsive to the signal from said second delay means for producing said derivative pulse output.

4. The system as in claim 2 further including means responsive to a selected plural number of occurrences of said output indications during said subsequent operating period for producing an output signal indicative of the occurrence of a plurality of abnormal QRS portions of received ECG. signals.

5. The system as in claim 4 further including:

means responsive to a plural number of occurrences of abnormal QRS portions for producing an output signal related to the frequency of abnormal QRS portions; and means responsive to a plural number of occurrences of abnormal QRS portions for producing an output signal related to the number of sequential abnormal QRS portions.

6. The system as in claim 1, said circuit means further including:

an oscillator for producing pulses at preselected intervals in response to the application of said derivative pulse output thereto; and an accumulator connected to receive said oscillator pulses for producing said first output indicative of the time said derivative pulse output is applied to said oscillator.

7. The system as in claim 6, said accumulator being a counter adapted to count pulses from said oscillator; and said storage means including a storage register which is operative to store the count of pulses by said counter during said first operating period.

8. The system as in claim 7 wherein said output means includes gating means for transferring into said counter the complement of the count of pulses stored in said storage register to preset said counter to the complement of said count of pulses for producing an overflow signal when the number of pulses applied to said counter during said subsequent operating period exceeds the stored count of pulses during said first operating period.

9. The system as in claim 2, said attenuating means including:

a variable attenuator; and means for adjusting said variable attenuator during said first operating period in response to the amplitude of the largest derivative of the ECG. signal applied to said signal-selecting means during said first operating period.

10. The system as in claim 1, said signal-selecting means including:

a signal filter having a band-pass frequency characteristic centered at approximately 25 hertz;

a variable attenuator for receiving the ECG. signals;

means for adjusting said variable attenuator in response to the amplitude of the derivative of the largest signal passed by said signal filter during said first operating period; and means coupled to the output of said variable attenuator for producing said derivative pulse output in response to signals passed by said variable attenuator during said subsequent operating period.

11. The method of analyzing electrocardiographic signals normally including P, Q, R, S and T wave portions comprising the steps of:

normalizing to a predetermined value the derivative of a selected portion of the ECG. signals received during a first operating period;

measuring the time during which the derivative of the normalized ECG. signal exceeds said predetermined value and also meets predetermined time duration requirements during the first operating period;

storing said measurement of time;

measuring the time during which the derivative of the normalized ECG. signals received during a subsequent operating period exceeds said predetermined value; and comparing said measurements during said first and subsequent operating periods to produce an output indication in response to said measurements attaining a preselected relationship.

12. The method as in claim 11 wherein:

the step of normalizing includes altering the amplitude of the derivative of received ECG. signals to preselected values; and the measuring step during each of said first and subsequent operating periods includes measuring the width of the normalized derivative of the QRS portion of the ECG. signals which exceed a predetermined threshold for a predetermined minimum period of time and which do not fall below said threshold for more than a predetermined maximum period of time.